Figure 12:
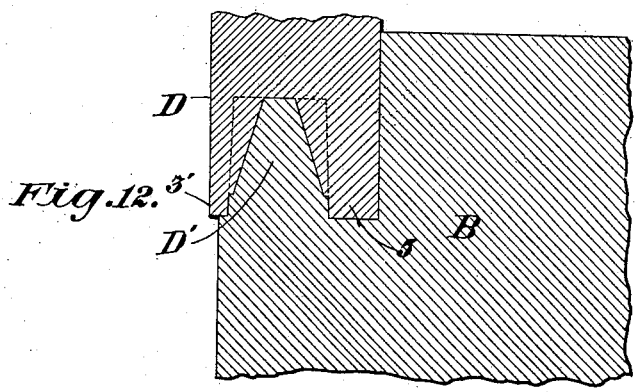

F. H. RICHARDS.
ART OF MAKING TYPE BARS.
APPLICATION FILED APR. 18, 1901. RENEWED MAR. 10, 1909.
919,238.
Patented Apr. 20, 1909.
4 SHEETS—SHEET 1.
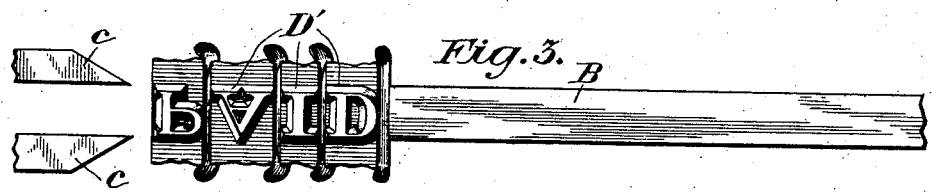
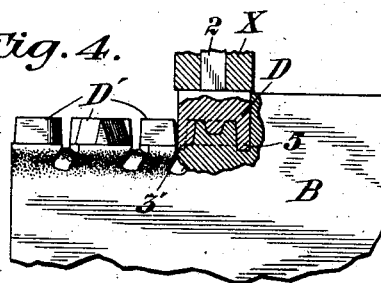
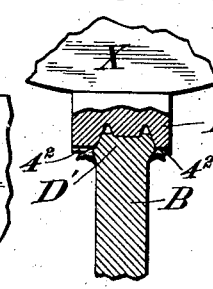
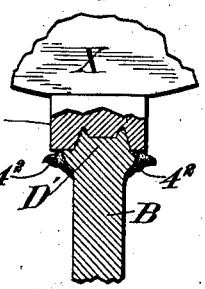
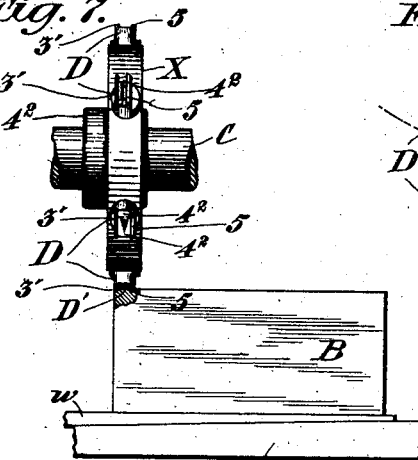
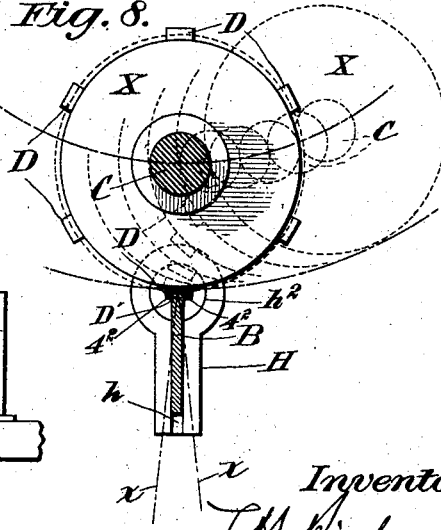
Witnesses:
C. W. Smith
F. N. Haviland
Inventor:
F. H. Richards F. H. RICHARDS.
ART OF MAKING TYPE BARS.
APPLICATION FILED APR. 18, 1901. RENEWED MAR. 10, 1909.
919,238.
Patented Apr. 20, 1909.
4 SHEETS—SHEET 2.
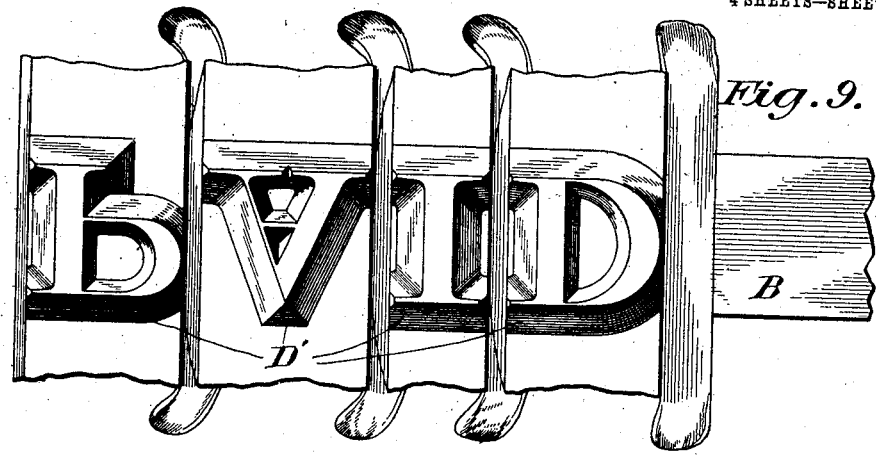
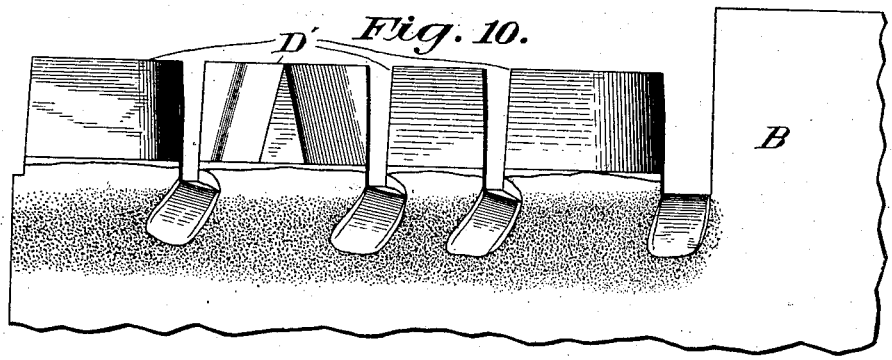
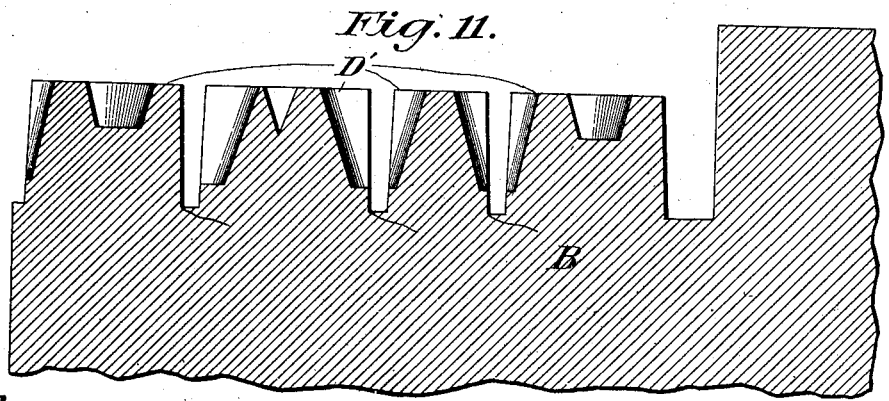
Witnesses:
Inventor:

F. H. RICHARDS.
ART OF MAKING TYPE BARS.
APPLICATION FILED APR. 18, 1901. RENEWED MAR. 10, 1909.

919,238.

Patented Apr. 20, 1909.
4 SHEETS—SHEET 3.

Witnesses:
Inventor:

F. H. RICHARDS.
ART OF MAKING TYPE BARS.
APPLICATION FILED APR. 18, 1901. RENEWED MAR. 10, 1909.
919,238.
Patented Apr. 20, 1909.
4 SHEETS—SHEET 4.
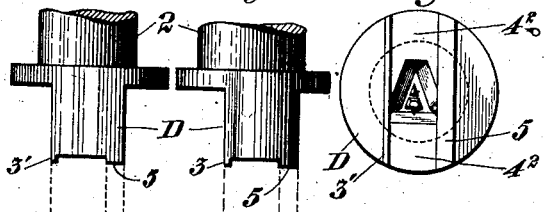
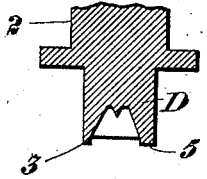
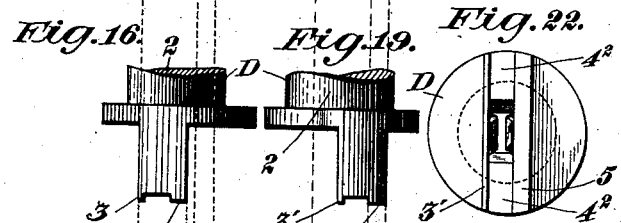
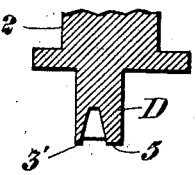
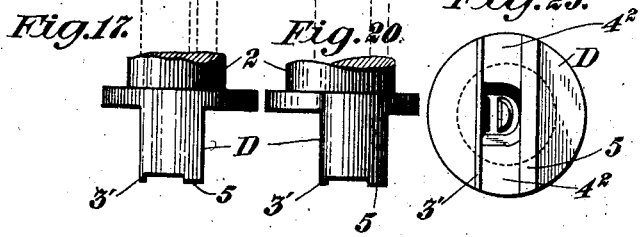
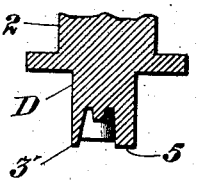
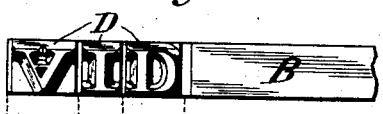
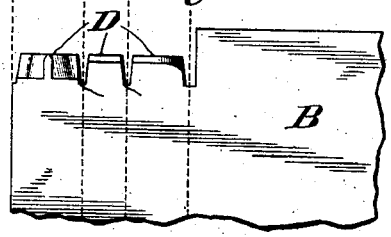
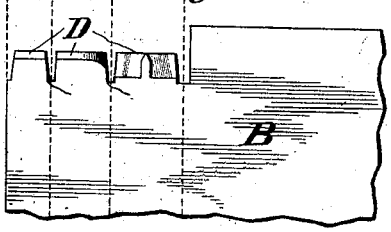
Witnesses:
Inventor:

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

ART OF MAKING TYPE-BARS.

No. 919,238.             Specification of Letters Patent.           Patented April 20, 1909.

Application filed April 18, 1901, Serial No. 56,480. Renewed March 10, 1909. Serial No. 482,571.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Type-Bars, of which the following is a specification.

This invention relates to the art of making composed types along the edge of a typebar-blank by a wrought process to form a type-bar.

Many efforts have been made to produce from a mass of type-formable material by the action of a die, a type suitable for use in and which would satisfactorily meet the requirements of the typographic art in point especially of sharp definition and durability, and to combine a number of such types, so formed, in a line of composed types or type faces in the endeavor to produce a typebar that would satisfy the demands of the art for successful commercial application.

In carrying out my present invention I avoid the necessity of setting off the type-blanks before the dies are brought into action, and I subject each type-formable portion of the typebar-blank to repeated actions which for the purpose of producing symmetrically-formed types are preferably alternated from side to side of the mass. These repeated actions result in the gradual reduction of the type-block to shape and are of such character that they operate to strengthen and finish the base portion of the block where the latter connects with the body of the typebar-blank and to condense and compact the impression and other faces of the type, beside operating to satisfactorily fill the angular portions and hair-line spaces of the die-cavity. The excess or surplus material is caused or forced to flow laterally or crosswise of the blank—that is, in a direction away from an adjacent type—and for the purpose of more effectually protecting this type from the material subjected to the action of the working die I preferably utilize a retaining wall at the side of the die for confining the material and controlling its direction of flow.

The less the resistance opposed to the formative stresses of the die during its operation upon the metal to form a type, the less, manifestly, will be the tendency to displace or distort adjacent finished types or surfaces. Moreover, it is clear that the flowage induced by the advancing die will naturally be along the line of least resistance, and in this connection, also, it is to be borne in mind the fact that some of the types used for forming the various characters of ordinary composition are more readily formed than others—that is, less work is performed by the dies in producing certain types than in producing others. In forming a series of different types, in other words, the material will need to be subjected to a less number of operations in some instances than in others, depending upon the particular type which is to be produced, and if the type-forming operation is carried beyond the stage in which the material has assumed the condition of a finished type, the tendency of the further action of the die is to mar or distort the type within the die-cavity. The line, also, of least resistance to flowage of the material under the die may be and almost invariably is in a direction such that this movement results in the tipping or displacement of the adjacent type. That is to say, in an organized system of forming composed types along a typebar-blank in which the various elements involved in the type-forming operation—for example, the amount of feed movement of the die and blank toward and against each other, the concurrent subsidiary motion, if there be such, the amount of surplus material to be removed by the die, &c.—are not adapted to each individual type to be formed, the result is generally an unsatisfactory typebar and one ill-fitted to meet the demands of the art.

In the practice of the present invention, according to one mode flowage arising from the type-formative stresses of the die is induced along a predetermined and preformed line or path of least resistance, which by its presence serves to protect the type adjacent to the working die, and by the facility which it offers for the movement of the material permits the die to be operated beyond the stage in which the material has assumed the condition of a finished type without marring such type, whereby the steps of the various type-forming operations may be the same in amount and kind for the entire series of dies. This method of forming types is set forth more fully in my companion application Serial No. 57,934, filed April 29, 1901, renewed June 17th, 1904, Serial Number 212,952 and refiled February 12th, 1907, Serial Number 110

356,975, to which reference may be made for a fuller disclosure.

The present method is a general one, in so far as it may be employed in practicing various improvements in the art of making wrought types upon a bar of metal.

Figure 13:
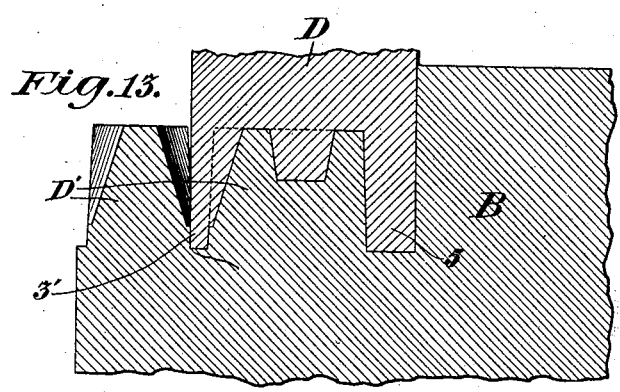
Figure 14:
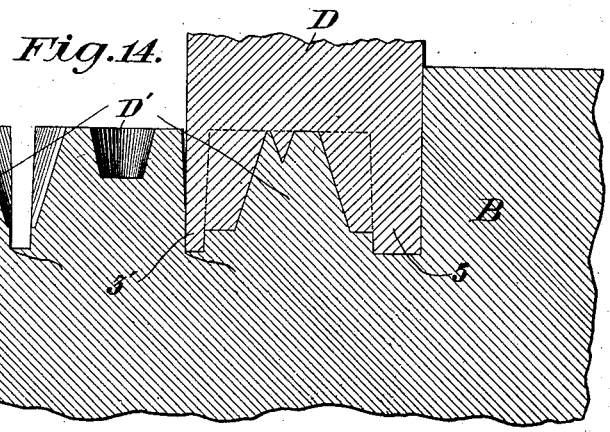

In the drawings accompanying this specification, Figures 1 and 2 are, respectively, a plan and a side elevation representing a typebar made according to my present invention. Fig. 3 is a plan view upon a somewhat larger scale than that to which Figs. 1 and 2 are drawn and represents a portion of a typebar-blank provided with a number of finished types, besides setting forth in a conventional way a pair of cutting instruments designed for trimming a blank or a typebar made therefrom to effect the removal of surplus material from the side thereof. Fig. 4 is a side elevation of a portion of a typebar-blank showing a portion of its edge provided with types and illustrates, in section, the position of a die in forming a type at or near the close of the type-forming operation, the scale of this figure and the following two figures being the same as that to which Fig. 3 is drawn. Figs. 5 and 6 are partly elevational and partly sectional views representing the relative positions of the die and the blank at different stages during the type-forming operation, the former figure showing the relative position at the beginning of the operation and the latter figure the corresponding position at the close. Fig. 7 is a side elevation of a portion of a typebar-blank, showing a die carrier or wheel and a blank-feeding wedge and its coöperative element, the scale of this figure being similar to that to which Figs. 1 and 2 are drawn. Fig. 8 is a face view of the die-wheel shown in Fig. 7 with the blank and working die shown in section, the feeding-wedge and its coöperative element being omitted in this figure. Figs. 9, 10, and 11, are, respectively, plan, elevational, and vertical sectional views of a portion of a typebar-blank provided with a number of composed and wrought types upon its edge, the purpose of this figure being to represent a certain combination of types each of which is of a width different from that of any other; the scale of these figures is very much enlarged as compared with the scale to which the preceding figures are drawn. Figs. 12, 13, and 14 are vertical sectional views drawn to the same scale as Figs. 9, 10, and 11, representing dies of different widths, each die being shown in the position it occupies at the close of the type-making operation and before the die has been withdrawn from the blank. Figs. 15, 16, and 17 are views drawn upon a smaller scale than that of Figs. 9 to 14, setting forth, in elevation, dies of different dimensions employed for making different types, and illustrates one system of combining the dies in the type-forming mechanism. Figs. 18, 19, and 20 illustrate another system of combining the dies. Figs. 21, 22, and 23 are bottom views of the dies represented in Figs. 15, 16, and 17, respectively. Figs. 24, 25, and 26 are longitudinal, axial sections of the dies represented in Figs. 15, 16, and 17, respectively. Figs. 27 and 28 are plan and elevational views, respectively, drawn to the same scale as that to which Fig. 3 is drawn, representing a certain permutation of types upon the edge of a typebar-blank, each type being of a different width than any of the others. Figs. 29 and 30 are views similar to Figs. 27 and 28, respectively, representing a different permutation of the types to that set forth in Fig. 27.

Similar characters of reference designate corresponding parts in all figures.

In carrying out my present improvements, the types, it may be stated in a general way, result from the operation of suitable type-forming dies upon a blank forced one member against the other to cause the penetration of the blank by successive selected dies, each of which completes its type before the next type in advance is made. The blank, designated in a general way throughout the present specification and drawings by B, is of any material suitable for the purpose—as, for instance, type-metal of proper composition brought into the requisite or desired shape in some suitable way—for example, by casting, rolling, or otherwise. I have found, however, that a process for so operating upon the material as to produce a substantially wrought blank as distinguished from a condition resulting from the casting of the same to shape, or at least a blank having that portion or those portions wrought which are concerned in the formation of the several type-blocks, is best suited to the practice of the present improvements. Moreover, the blank upon which the types are to be formed may be a continuous ribbon or rod, or it may be in the form of a separate piece having a length substantially equal to the length of the finished typebar, or of any other desired and proper dimension.

In effecting the penetration of the material of the blank by the die it is immaterial whether the movement, which I may designate as a transverse feeding movement, is imparted to the blank or die or to both, but I find it convenient to feed the blank against the die and have represented in a general way in Fig. 7 a feed element for imparting such transverse feeding movement to the blank, the same being illustrated for the purposes of the present specification. The particular element there set forth consists of a wedge $w$ shiftable to and fro by suitable means and upon which the blank B is supported and which is adapted to coöperate with an incline $w^2$, the combination being a suitable one for raising and lowering the blank. This rectilinear movement of the die and blank toward and against each other is not the only movement utilized in carrying out my present improvements, for facilitating the filling of the die-cavity, for disposing of the excess or surplus material separated or sheared from the blank during the type-forming operation, and for producing a compact and dense condition of the various surfaces, but in combination with this movement there is a relative subsidiary movement imparted to the members, which combined movement operates to produce a type gradually and by a series of reductions and to accomplish a coincident working out of the excess material.

In forming a type upon a typebar-blank at such a distance from an already formed and finished type as required by ordinary composition, the tendency of the formative stresses of the advancing die and of the excess material during its displacement, is to distort or derange the latter type, a result invariably ensuing unless measures are taken to control the movement of the material to lessen or control the effects of the formative stresses of and those induced by the die. This subsidiary movement adverted to, operates in conjunction with the aforesaid transverse feeding movement to force excess material away from the adjacent type—that is, crosswise or laterally of the blank—and for further protecting the already formed type, I preferably use a wall or plate adapted to enter into the comparatively narrow space between the finished type and the material under the working die where it is located during the type-forming operation, serving as a retaining surface against which the moving material or flowage is received and by which its motion is directed. Such wall, it is evident, so far as the purposes it fulfils are concerned, may be separate from the die and operated independently thereof, but I find it convenient to form it as a part of the die and operate the two as a unit. The foregoing subsidiary movement operating to gradually form a type and work excess material outward transversely or crosswise of the blank preferably reverses in direction alternately, for the reason that such alternating motion is conveniently attained and is best adapted to produce a symmetrically formed type. In other words, a relative oscillatory motion is imparted to the members (the die and the blank) during the period of type-forming, and for the production of this relative motion I find it convenient to oscillate the blank by imparting such motion to a suitable workholder in which the blank is supported. Good results being obtained in the character of the types produced by making this oscillatory motion take place about a fixed axis, although the present invention is by no means limited in its scope to an oscillation about such an axis, as this to and fro or alternating motion may be of a different character, I have represented in Fig. 8, in a conventional way, a portion of a holder, designated by H, having a blank-supporting slot $h$ through which the blank is adapted to move under the control of the abovementioned wedge $w$, (which, with its coöperative incline $w^2$, is not shown in this figure.) This holder H is adapted to be oscillated by some suitable means about an axis in line with the direction of length of the blank, defined, for instance, by a supporting shaft or stud at each end of the holder, a construction indicated in a general way by the circle $h^2$. The limits of this oscillatory movement of the holder H are also indicated in a general way in this figure by the dotted lines $x$—$x$ and the best position for the oscillatory axis, as demonstrated by the quality of types produced, appears to be just within or immediately adjacent to what will form the impression face of the finished types. The direction, rapidity, extent, &c., of these movements—that is, the transverse feeding movement and the oscillatory movement—and the relation of these various factors to each other, as well as the relation of the two specified movements one to the other, may be varied in any desired manner. The duration of the oscillatory movement may be embraced, for instance, within the limits of the period during which the members are fed toward and against each other, but preferably the oscillation will commence after the type has been partially formed and cease just before the feed movement terminates. Furthermore, both movements may be uniform throughout their whole duration or either may be varied or they may both be varied. With respect to an appropriate interrelation, I have found good results to follow from a gradual reduction in the speed of the transverse feeding movement during the latter portion of such movement with a concurrent oscillatory motion also decreasing in extent or amplitude of oscillation during the later stages of the operation and ceasing altogether just prior to the termination of the feed.

The flowage induced by the type-formative stresses of the working die naturally takes place along the line of least resistance, and these stresses have a tendency to detrimentally effect a finished type within the flowage radius of the forming type, for such sphere of disturbance extends ordinarily some distance beyond the narrow space between the letters of a word as words are usually composed and spaced. Even though a wall is provided at the side of the die for the protection of the type at the rear, considerable pressure is exerted thereon by the metal under the compression of the die, and as this wall must be comparatively thin owing to the comparative narrowness of the space into which it is fed it is liable to spring and to ineffectually confine the material endwise of the blank. Furthermore, the formative stresses are liable to be transmitted under its lower edge, while if in the attempt to prevent this the wall is made comparatively deep, measured in line with the depth of the blank, and is advanced into the edge of the latter to reach beyond the flowage radius, since the wall must have some width, however small it may be, and the blank manifestly opposing some resistance to penetration, there is created by the wall itself, as it advances, stresses of greater or less magnitude tending likewise to produce a distortion of a formed type or type face. As previously pointed out, moreover, some of the types used in the typographic art are more readily formed than others—that is, are produced by a less amount of work on the part of the forming die with the type finished and the cavity of the die completely filled before the die has advanced into the blank to that extent which is necessary to form other types. Upon the further advancement of the die of this early finished type the type-body within the die-cavity must be carried bodily downward, creating a tendency to develop stresses in the metal which may extend to greater distances than those due or incident to the type-formative action alone of the die; hence though a type may be produced without distorting an adjacent type, upon an attempt to sink the former type to the general typographic level of the bar there may result the distortion of the finished type face or faces. If the type-forming movement, whatever be its nature, is continued during the depression of the finished type-body, which will in general be the case, this continued movement also tends to wear away or otherwise mar the impression face of the type. In any organized system, therefore, of forming a series of consecutive types along the edge of a typebar-blank where individual type-blanks or blocks are not preliminarily treated to correspond with the particular types to be formed therefrom and the various steps and motions incident to or required in the type-forming process are not adapted to each individual type some provision or mode of operation, to obtain the best results, should exist generally for nullifying the distorting and destructive tendency of those dies which complete their types above the common level of the types on the finished typebar.

One of the features involved in the practice of the present invention according to one mode, consists in the inducement of flowage along a predetermined and preformed path or surface of least resistance whereby the formative and other stresses, in so far as they are concerned in building up and positioning a type-block surmounted by a finished face, occasion a movement along a path, predetermined in position and interposing between the mass under the working die and the adjacent type an element of protection for the latter.

The type-forming instrumentalities or dies used in carrying out the present improvement are of suitable form and construction, and for the purpose of reference herein are designated in a general way by D. These dies D are, as represented in the drawings attached to the present specification, adapted for the formation of a type-block or column, designated in a general way by D', connected integrally to the stock of the blank and surmounted by the impression face of the type-block, (for so I may term the upper face of the block of the requisite contour to yield ultimately the configuration of the desired printed character.)

The several dies may be adjusted and brought into proper relation to the blank B supported in the holder H by hand or by mechanism or by any other means operated or operating to attain the desired sequence in the type composition. The dies, as an instance of a device for their convenient manipulation, may be mounted upon the periphery of a die-carrier, shown in the form of a wheel or disk and designated in a general way by X, (see Figs. 7 and 8,) whose shaft C is rotatably mounted upon an appropriate supporting carrier (not shown) which, as indicated in a general way in Fig. 8, may be a rotary carrier rotatable about an axis, (not shown.) The progressive movement of the parts as a selected die thereon is brought into juxtaposition and the die-wheel rotates and revolves, is indicated in a general way by the dotted circles and arcs, from which it is apparent that, assuming the various parts to be as set forth, the die moves along a path which is of the nature of a cycloid. Each die may be provided with a shank 2 adapted to fit securely into a corresponding socket in the die-wheel, by which means the dies may be secured to the latter. The previously-mentioned retaining wall operating to confine the material endwise of the blank is, as set forth in the drawings accompanying the present specification, made integrally with the die—that is, this wall and its die are made as a single operative tool, the wall being designated by 3'.

The action to which the material under the die, considered in its entirety, is subjected as a result of the oscillatory movement herein described when the blank is under the compression of the die may be described as a rolling one. As the die advances into the material of the blank and the latter is oscillated from side to side, more and more of the material is forced into the die-cavity and subjected to the forging and swaging action of the walls and faces of the cavity. More and more of the material necessary to build up and form the type-block as the edges at the outer portion of the die alternately bite afresh into the blank is forced or squeezed upward into the die, and under the impact and pressure of the interior faces thereof as the relative inclination of these faces and the surfaces of the mass changes, by reason of the oscillatory movement, the material is forged and wrought to form, while the faces at the bottom of the die-cavity serve to swage the upper portion of the type-block to shape. In other words, the action to which the material is subjected is one effecting a gradual reduction thereof, operating to compact the material of the type-block and render the surfaces smooth and unbroken, and to connect them one with the other in a manner precisely conforming to the bounding edges or lines of intersection between the planes of the corresponding faces of the die. Moreover, the forging operation results in the strengthening of the integral connection of the block with the stock of the blank. During this oscillatory movement, also, extending first on one side and then on the other, an outlet is created by reason of the slight separation of the material from the faces of the die through which air confined in the latter may escape and oil, grease, and other foreign matter be squeezed outward, assisting in the production of an exact counterpart of the type-forming die.

I find it convenient to remove those portions of the blank at the sides of the forming type-block concurrently with the formation of the type-block, and I utilize for this purpose the described oscillatory motion to gradually work such material outward laterally of the blank. The crosswise movement of this material is effectively accomplished by presenting to it at such points where movement or flow is required, a relatively-fixed surface or surfaces which, as the result of the oscillatory movement, works the material under it outwardly by pressing on the same. Such surfaces, it is manifest, may be independent of the die, but for the sake of convenience they may be connected therewith and may be, in part at least, formed by the surfaces of integral extensions of the die-body. They are here so represented, (see particularly $4^2$, $4^2$.) The action to which the material is subjected and which operates to effect the movement of the surplusage crosswise of the blank—that is, in a direction in which it will not interfere with a finished type—may evidently be described as a rolling one, resulting in the rolling sidewise of the blank and the excess and superabundant material.

The direction of the aforementioned predetermined path or surface of least resistance is such as to facilitate the flowage of the metal under the rolling, swaging, forging, and other operations to which it is subjected, and as these operations tend to move the excess material outward toward the sides of the blank this path or surface extends crosswise of the latter. Such surface is also located under a portion at least of the metal subjected to the type-formative-action, and I find it convenient to form successive surfaces along the blank for the consecutive types simultaneously with the production of the types—that is, a surface is formed each time a type is produced—of a width, however, it may here be stated, insufficient to injuriously weaken the integral connection of the type-block with the stock of the blank.

The flowage path or surface is made most advantageously I find in advance of a type along the blank, and, in practice, I form the same by making the vertical cross-space which will ultimately separate two consecutive type-blocks, sufficiently wide when first formed, to enter into the field of the next type or character to be made. That is to say, the aforesaid surface is most readily formed by making the space or slot at the end of the last-formed type wider than this space will actually be when the next consecutive type is completed for making the next consecutive letter in the composition. It is obvious from the above description that in so far as the respective formation of the types and these spaces are concerned, each space may be formed independently of the formation of a type, and, furthermore, that these results may be attained by separate and independent tools or devices. I find it convenient, however, to form a space simultaneously with the formation of a type and by a tool connected to the type-forming die and have shown in the various figures a space-forming die in the form of a plate, designated in a general way by 5, on that side of the die nearest the unoperated-upon portion of the edge of the blank.

For the production of a typebar provided with a series of composed and wrought types upon its edge, and for the making of which the type-forming process should be one permitting any possible permutation and combination of types to be formed, it is desirable as a general thing that the same conditions shall obtain each time a die is selected for making a particular type. The types of ordinary composition, however, vary in width. Thus, for instance, the A of a font is of a different width to the I, and this varies from the corresponding dimension of the D, these particular letters being chosen for the purpose of illustrating the variability of this particular feature.

For the purpose of maintaining the conditions as uniform as may be, I make the retaining wall provided at the side of each die of the same width throughout the series and similarly as to the corresponding dimension of the space-forming dies provided on the other side of the type-dies proper, whereby the spaces between the letters of a word remain uniform and the extent to which each type is shifted backward and overlaps the integral connection of the type at the rear with the stock of the blank is also constant for all the types of a given font used in the composition.

Owing to the different widths of the type-dies, it is necessary to move or feed the blank and dies with relation to each other in a direction lengthwise of the blank, different amounts in order to bring the proper portions of the blank in succession under the selected dies. Such longitudinal feeding movement may manifestly take place either prior to the locating of the selected die at the type-forming point or subsequent thereto, and is ordinarily attained by some suitable mechanism.

The dies are advantageously arranged, if a die-carrier as herein described is employed, with respect to a datum line thereon, being so related one to the other that upon a feeding movement taking place the proper segment or portion of the typebar-blank is brought into juxtaposition to a selected die at some time prior to the contact of the die with the blank. Thus, for instance, if it is desired that a longitudinal feeding movement shall take place after a type has been formed and under the control of the die which has just effected the making of the type, the dies may be arranged as shown in Fig. 7 and indicated in a diagrammatic way in Figs. 15 to 17, in which it will be seen that the outer face of the retaining wall of the several dies D are disposed in alinement with each other. When organized in this manner after a die shall have completed its type and at some time during its recession from the type-making point, a relative shifting of the blank and die longitudinally of the former takes place, sufficient in amount to bring the outer face of the die walls substantially in line with that cross-face of the last formed and completed type-block adjacent to the unoperated-upon portion of the edge of the blank, the latter after this shifting movement has taken place being in its proper position to be acted upon by the next selected die when this die shall have been brought into contact with the blank. If, however, it is desired that a longitudinal feeding movement shall take place prior to the assuming, by the selected die, of its type-forming position, the dies may be arranged upon the die-carrier with the outer faces of the space-forming dies at the sides of the type-forming dies in alinement, as shown diagrammatically in Figs. 18 to 20, inclusive. If this be the organization, prior to the locating of the die at the type-forming point, a longitudinal feeding movement takes place to bring the blank into proper relation with the die which has been selected and which is moving to its type-forming position. In this latter organization, therefore, the normal position of the blank with relation to the dies is that in which the type last formed remains under the die-carrier. Evidently, now, whichever organization be adopted, when a selected die is brought over the blank to form a type and the two are pressed together, the retaining wall whose thickness determines the width of the space between the finished type-blocks, which, as has been stated, is uniform for the entire series of dies, will not fill the slot made by the space-forming die 5, but will leave a space under the type-forming die, which space will be filled by the backward shifting of the material of the type-block, such movement lengthwise of the blank being arrested by the retaining wall and the surface previously made by the lower edge of the space-forming die and exposed at the edge of the retaining wall. Each type-block is thus supported against its adjoining block along the overlapping surface of contact at the rear, besides which support each type-block is integrally connected to the stock of the blank. The support afforded during the formation of the successive type-blocks is thus an additive and cumulative one, resulting in a unified and integral structure.

The type-forming die D is shown in some of the figures in operative position over the blank B, and the space-forming die or plate 5 is also shown integral with the die. The extensions of both the retaining wall and the plate at the sides of each of the surfaces $4^2$, $4^2$ of the extensions of the die-body and forming virtually a part thereof may be carried somewhat below those surfaces if desired and as here intended to further depress and work out the portions of the blank under them.

As the die sinks into the blank and the material is subjected to the forging and rolling action of the die faces and the rolling action of the various other faces the material in the die-cavity cants over, shifting endwise of the blank toward the adjacent finished type-block at the rear until those portions adjacent to the bottom of a die-cavity are restrained from further endwise movement by the retaining wall while the mass moves bodily more and more lengthwise to overlap the surface at the bottom of the space formed by the previously used space-forming die, ultimately bedding upon this surface along which and laterally of the blank the material as it is subjected to the pressure of the working die may move more readily than in any other direction.

The spaces between the groups of types forming words and between separated or isolated types, whether such spaces be of uniform width or otherwise, may be produced in any appropriate manner, but preferably they will be formed by a suitable die or dies operating to remove portions of the edge of the blank sidewise of the latter and form spaces by a rolling action, as already described.

Material forced beyond the planes of the sides of the typebar or typebar-blank by the operation of the dies may be trimmed off and removed to bring the sides of the bars into substantial parallelism by some suitable means. For instance, such a means is represented in Fig. 3, where a pair of cutting instruments *c*, *c*, operable from suitable mechanism serve to trim off the material adjacent to the types.

Having described my invention, I claim—

1. That improvement in the art of making a line of type which consists in operating upon successive portions of the edge of a blank with type dies having space-forming dies at the side of greater width than the type-separating spaces.

2. That improvement in the art of making a line of type which consists in operating upon successive portions of the edge of a blank with type dies having retaining walls at the side of uniform width and at the other side space-forming dies of greater width than the said retaining walls.

3. That improvement in the art of making a line of type which consists in operating upon successive portions of the edge of a blank with dies having space-forming dies of uniform width and retaining walls of uniform width, the width of the space-forming dies being greater than that of the said retaining walls.

4. That improvement in the art of making types which consists in operating upon the edge of a blank with a series of dies having type separating walls and wider space-forming dies and which are selected and brought into particular positions to form a desired sequence in the composition, and shifting the blank longitudinally with reference to the dies an amount corresponding to each die selected to form properly-spaced types.

5. That improvement in the art of making a line of type which consists in working successive portions of the edge of a blank, thereby forming on each portion a type and a space in advance thereof extending into the field of the type next to be made.

6. That improvement in the art of making a line of type which consists in subjecting successive portions of the edge of a blank each to a working movement to work the stock outward laterally of the blank and form a type at that point and a space in advance of the type extending into the field of the type next to be made.

7. That improvement in the art of making a line of type which consists in subjecting successive portions of the edge of a blank to a working movement to work the stock outward laterally of the blank and the material forming the type backwardly of the latter and thereby form a type on each such portion and a space in advance thereof extending into the field of the type next to be made.

8. That improvement in making a line of type which consists in impressing in succession the successive portions of a blank with type making instrumentalities to thereby form a succession of types and simultaneously with the forming of each type preparing the blank in advance thereof.

9. That improvement in the art of making a line of type which consists in subjecting each successive type-blank portion of a main blank to a working movement to thereby concurrently form at each working movement a type and a space in advance thereof extending into the character field of the next type to be made.

10. That improvement in the art of making a line of type which consists in subjecting each successive type-blank portion of a main blank to a working movement to thereby concurrently form at each working movement a type and a space in advance thereof extending into the character field of the next type to be made, and simultaneously with the making of each type shift the stock thereof backward.

11. That improvement in the art of making a line of type which consists in subjecting each successive type blank portion of a main blank to a working movement to thereby concurrently form at each working movement a type and a space in advance thereof formed by shearing off the material in advance of such type-block.

12. That improvement in the art of making a line of type which consists in subjecting each successive type blank portion of a main blank to the action of a proper die having a space forming instrumentality at the side thereof to remove by sidewise flowage the portion of the material occupying the contemplated space.

13. That improvement in the art of making a line of type which consists in subjecting each successive type-blank portion of a main blank to a working movement to thereby concurrently form at each working movement a type and a space extending into the character field of the next type to be made.

14. That improvement in the art of making a line of type which consists in subjecting each successive type-blank portion of a main blank to a working movement to thereby concurrently form at each working movement a type and a space extending into the character field of the next type to be made, and simultaneously with the making of each type to shift the stock.

15. That improvement in the art of making a line of type which consists in forming, while each type-block is being formed, a flowage path adjacent to the succeeding type-block by making the vertical cross-space which will ultimately separate two consecutive finished type-blocks sufficiently wide when first formed to enter into the field of the type or character to be made upon such succeeding type-block.

16. That improvement in the art of making a line of type which consists while forming one type in making a space or slot at the end of said type wider than this space will actually be when the next consecutive type is completed.

17. That improvement in the art of making a line of types which consists in forming the types successively along the edge of a blank, and while making one type forming a flowage path for the displacement of the excess metal from the next succeeding type to be formed.

18. That improvement in the art of making a line of type which consists in forming the types in succession upon the edge of a blank and concurrently forming a flowage space for the next succeeding type and shifting the material of each forming type into the flowage path produced in the formation of the previously formed type.

19. That improvement in the art of making a line of type which consists in forming the types in succession along the edge of a blank, and while making one type forming a flowage space within the space which will be occupied by the next completed type and shifting the material of the forming type into such flowage space.

20. That improvement in the art of making a line of type which consists in operating upon successive portions of the edge of a blank with dies and concurrently forming flowage paths for excess metal.

21. That improvement in the art of making a line of type which consists in forming the types in succession upon the edge of a blank and concurrently forming flowage paths for the excess metal.

22. That improvement in the art of making a line of type which consists in forming the types in succession upon the edge of a blank and concurrently forming a flowage path for the excess metal.

23. That improvement in the art of making a line of type which consists in forming a type successively upon the edge of a blank and while forming it concurrently forming a flowage path for the excess metal of the adjacent type and causing the excess metal thereof to flow along the flowage path made while forming the preceding flowage path.

24. That improvement in the art of making a line of type which consists while forming each of the several types in forming a space in advance thereof wider than the letter space requirements of such line.

25. That improvement in the art of making typebars which consists while forming a type in forming in advance thereof a space wider than the normal letter space.

26. That improvement in the art of making typebars which consists in compressing a portion of the edge of a typebar-blank in contact with a combined type and space forming die and thereby forming a type and space extending into the field of the next type to be made.

27. That improvement in the art of making a typebar which consists in compressing a portion of the edge of a typebar-blank in contact with a die having a type-forming member, and also a space-forming member disposed in advance thereof, and thereby forming a type and a space extending into the field of the next type to be made.

28. That improvement in the art of making typebars whih consists in compressing a portion of the edge of a typebar-blank in contact with a die having a type-forming member and space-forming members at opposite sides thereof, one of the space-forming members being wider than the other, and thereby forming a type and spaces of unequal width at the sides of the type.

29. That improvement in the art of making typebars which consists in first forming on the edge of a typebar-blank a type and a space in advance thereof extending into the field of the next type to be made, and then forming a second type in advance of such space and partially filling the latter.

30. That improvement in the art of making typebars which consists of first forming on the edge of a typebar-blank a type and a space in advance thereof, and then subjecting a succeeding portion of the edge of such blank to the compressing action of a combined type and space forming die and spreading out the stock rearward of the blank partially filling the previously-formed space, and thereby forming in advance of the first type a second type.

31. That improvement in the art of making a line of type which consists in successively subjecting successive portions of the edge of a blank to the working of proper type-dies each having a space-forming die at one side adapted to operate upon the blank in advance of the forming type.

FRANCIS H. RICHARDS.

Witnesses:
 FRED. J. DOLE,
 C. E. VOSS.